United States Patent
Maron et al.

(10) Patent No.: US 10,432,397 B2
(45) Date of Patent: Oct. 1, 2019

(54) MASTER PASSWORD RESET IN A ZERO-KNOWLEDGE ARCHITECTURE

(71) Applicant: Dashlane, Inc., New York, NY (US)

(72) Inventors: Guillaume Maron, Paris (FR); Frédéric Rivain, Paris (FR); Alexis Fogel, Levallois-Perret (FR)

(73) Assignee: Dashlane SAS, Paris (FR)

( * ) Notice: Subject to any disclaimer, the term of this patent is extended or adjusted under 35 U.S.C. 154(b) by 141 days.

(21) Appl. No.: 15/642,444

(22) Filed: Jul. 6, 2017

(65) Prior Publication Data

US 2018/0323970 A1    Nov. 8, 2018

Related U.S. Application Data

(60) Provisional application No. 62/500,676, filed on May 3, 2017.

(51) Int. Cl.
| | |
|---|---|
| *H04L 9/08* | (2006.01) |
| *H04L 9/06* | (2006.01) |
| *H04L 9/14* | (2006.01) |
| *H04L 9/30* | (2006.01) |
| *H04L 9/32* | (2006.01) |

(52) U.S. Cl.
CPC .......... *H04L 9/0891* (2013.01); *H04L 9/0618* (2013.01); *H04L 9/083* (2013.01); *H04L 9/0822* (2013.01); *H04L 9/0825* (2013.01); *H04L 9/0863* (2013.01); *H04L 9/0894* (2013.01); *H04L 9/14* (2013.01); *H04L 9/30* (2013.01); *H04L 9/3218* (2013.01)

(58) Field of Classification Search
CPC ... H04L 9/0891; H04L 9/0618; H04L 9/0822; H04L 9/0863; H04L 9/0894; H04L 9/14; H04L 9/30
See application file for complete search history.

(56) References Cited

U.S. PATENT DOCUMENTS

| | | |
|---|---|---|
| 5,434,918 A | 7/1995 | Kung et al. |
| 5,495,533 A | 2/1996 | Linehan et al. |
| (Continued) | | |

OTHER PUBLICATIONS

Apple Technical White Paper (Best Practices for Deploying FileVault 2, Aug. 2012, 42 pages) (Year: 2012).*

(Continued)

*Primary Examiner* — Oleg Korsak
(74) *Attorney, Agent, or Firm* — Merchant & Gould P.C.

(57) ABSTRACT

Examples of the present disclosure describe systems and methods relating to master password reset in a zero-knowledge architecture. A master password reset may be used to regain access to encrypted user data despite not having access to the master password associated with decrypting the user data. As an example, the user data may be encrypted using a local ciphering key, wherein the key may be encrypted using a master password and stored. A second copy of the key may be stored, wherein the second copy may be encrypted using a recovery key. The recovery key may then be stored by a third party. In a reset scenario in which the master password is forgotten, the recovery key may be retrieved from the third party and used to decrypt the second copy of the local ciphering key, thereby providing access to the encrypted user data without use of the master password.

20 Claims, 10 Drawing Sheets

(56) References Cited

U.S. PATENT DOCUMENTS

| | | | |
|---|---|---|---|
| 5,560,008 | A | 9/1996 | Johnson et al. |
| 5,684,951 | A | 11/1997 | Goldman et al. |
| 6,044,155 | A | 3/2000 | Thomlinson et al. |
| 7,472,423 | B2 | 12/2008 | DeCenzo et al. |
| 8,006,280 | B1 | 8/2011 | Hildebrand et al. |
| 8,028,329 | B2 * | 9/2011 | Whitcomb .............. G06F 21/33 726/5 |
| 8,059,818 | B2 | 11/2011 | Asokan et al. |
| 8,601,600 | B1 | 12/2013 | Shankar |
| 8,990,888 | B2 | 3/2015 | Busser |
| 9,330,245 | B2 | 5/2016 | Maron |
| 2002/0122553 | A1 | 9/2002 | Kao |
| 2003/0177401 | A1 | 9/2003 | Arnold |
| 2004/0123159 | A1 | 6/2004 | Kerstens et al. |
| 2004/0187018 | A1 | 9/2004 | Owen et al. |
| 2005/0222963 | A1 | 10/2005 | Johnson |
| 2005/0228994 | A1 | 10/2005 | Kasai et al. |
| 2006/0235796 | A1 | 10/2006 | Johnson et al. |
| 2007/0011724 | A1 | 1/2007 | Gonzalez et al. |
| 2007/0192841 | A1 | 8/2007 | Kim |
| 2008/0104709 | A1 | 5/2008 | Averyt et al. |
| 2008/0155276 | A1 | 6/2008 | Chen et al. |
| 2008/0216153 | A1 | 9/2008 | Aaltonen |
| 2009/0235346 | A1 | 9/2009 | Steinberg |
| 2009/0288143 | A1 | 11/2009 | Stebila et al. |
| 2010/0005287 | A1 | 1/2010 | Rollins |
| 2010/0017616 | A1 | 1/2010 | Nichols et al. |
| 2010/0083358 | A1 | 4/2010 | Govindarajan et al. |
| 2010/0100945 | A1 | 4/2010 | Ozzie et al. |
| 2010/0172504 | A1 | 7/2010 | Allen |
| 2010/0174911 | A1 | 7/2010 | Isshiki |
| 2010/0228987 | A1 | 9/2010 | Dinov |
| 2011/0009092 | A1 | 1/2011 | Etchegoyen |
| 2011/0252243 | A1 | 10/2011 | Brouwer |
| 2012/0072979 | A1 | 3/2012 | Cha et al. |
| 2012/0117455 | A1 | 5/2012 | Fogel et al. |
| 2012/0131656 | A1 | 5/2012 | Slaton et al. |
| 2012/0192253 | A1 | 7/2012 | Betsch et al. |
| 2012/0323717 | A1 | 12/2012 | Kirsch |
| 2013/0111217 | A1 | 5/2013 | Kopasz et al. |
| 2013/0318581 | A1 | 11/2013 | Counterman |

OTHER PUBLICATIONS

Dashlane Security Whitepaper, Nov. 2011, https://www.dashlane.com/download/Security-Whitepaper-Final-Nov-2011.pdf., 9 pages.
"LastPass Gets the Green Light from Security Now!'s Steve Gibson", LastPass Blog, (http://blog.lastpass.com/2010/07/lastpass-gets-green-light-from-security.html), Jul. 21, 2010, 11 pages.
Encryption—How does LastPass store my passwords on their website?, Stack Exchange, (http://webapps.stackexchange.com/questions/11361/how-does-lastpass-store-my-passwords-on-their-website), Jan. 16, 2011, 2 pages.

* cited by examiner

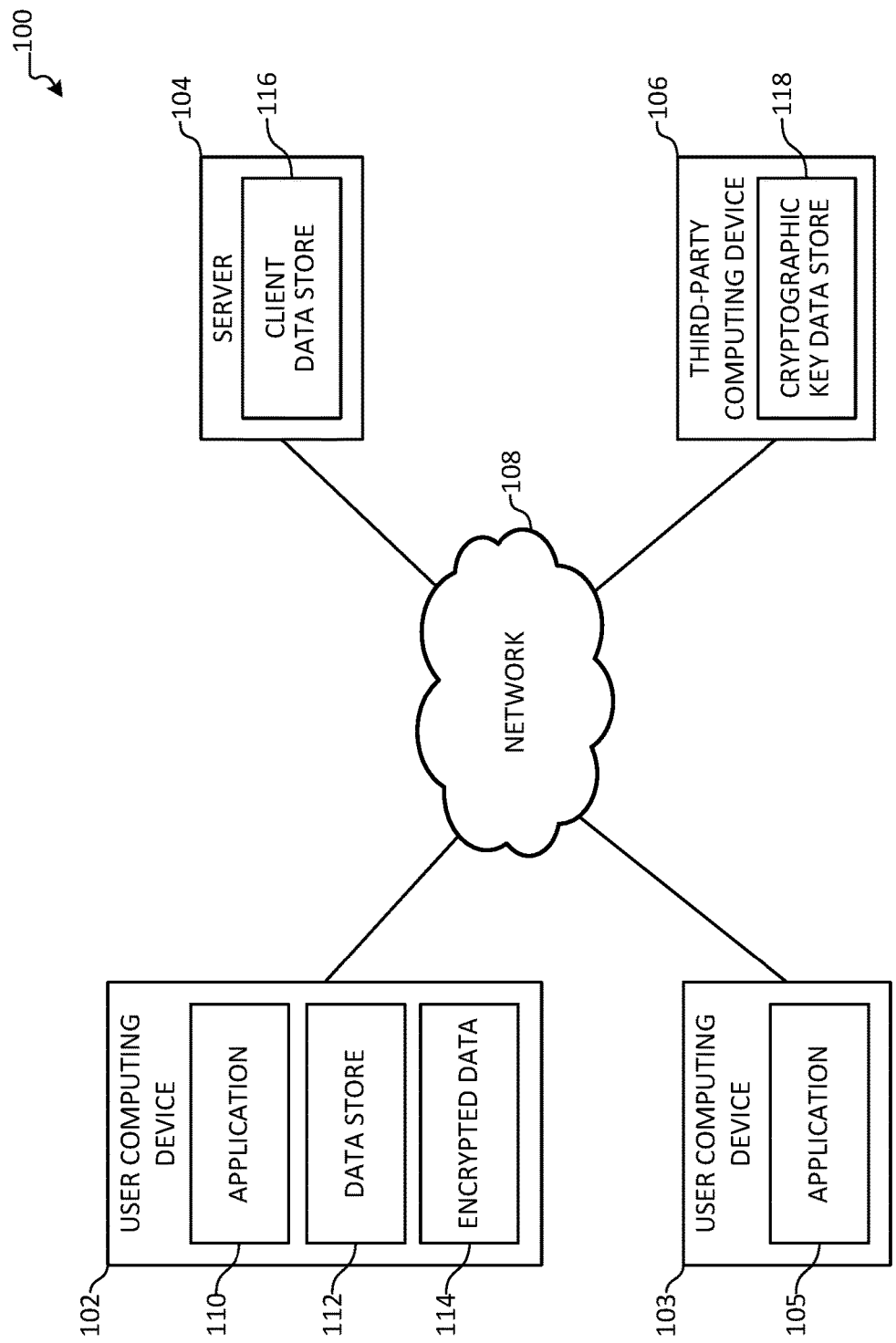

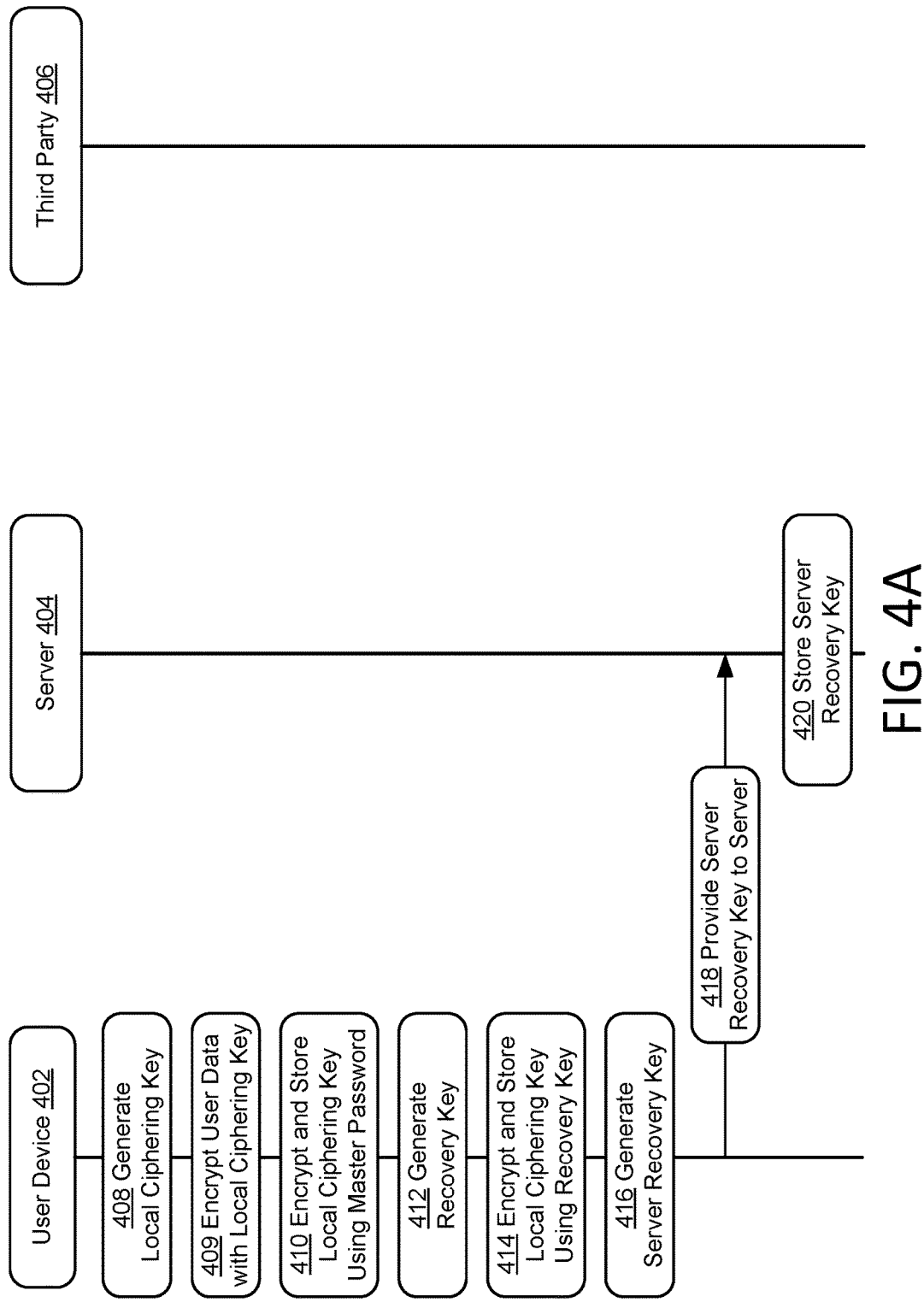

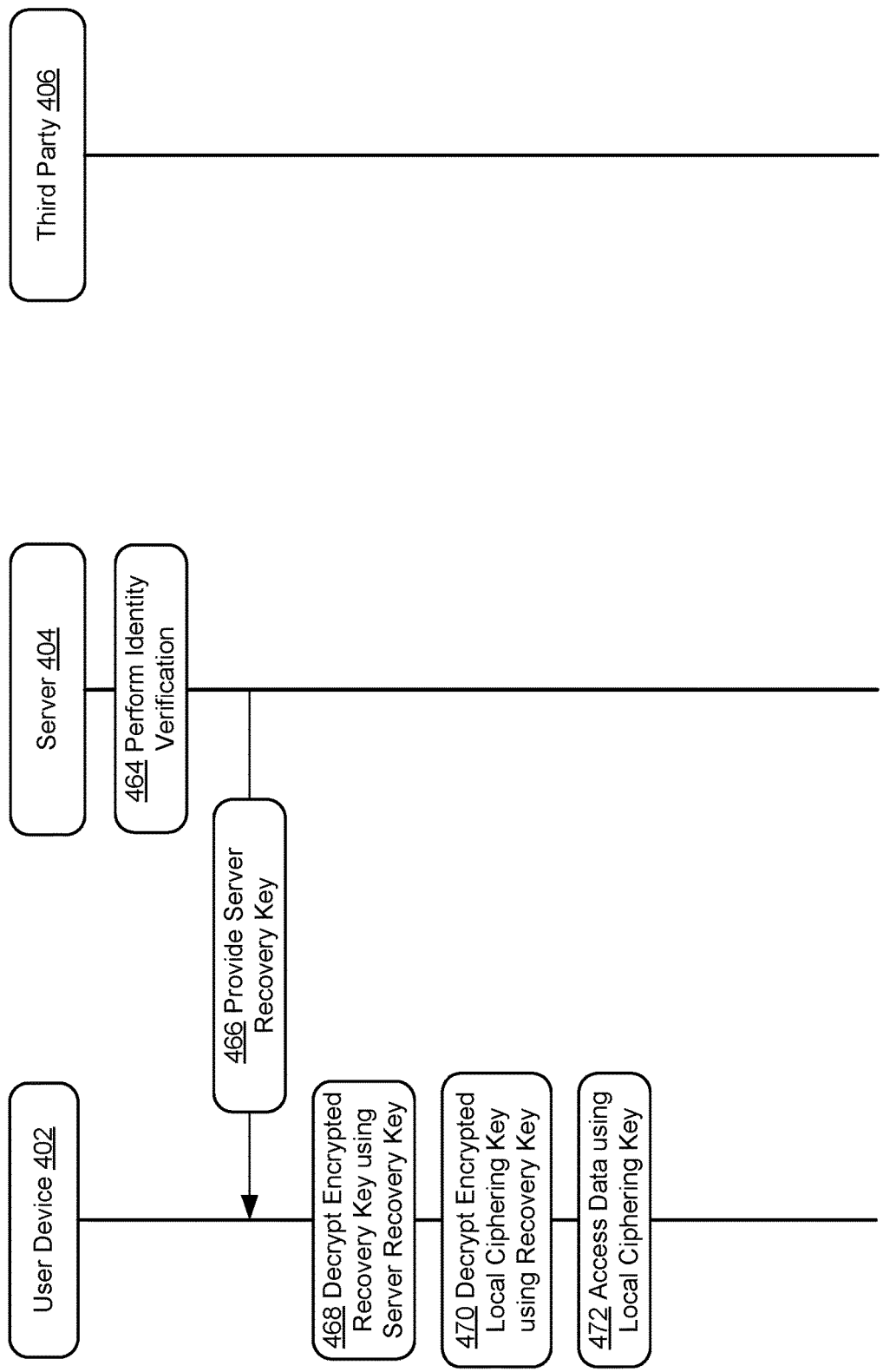

MASTER PASSWORD RESET IN A ZERO-KNOWLEDGE ARCHITECTURE

CROSS-REFERENCE TO RELATED APPLICATION

This application claims priority to U.S. Provisional Application No. 62/500,676, entitled "Master Password Reset in the Context of a Zero-knowledge Architecture," filed on May 3, 2017, the entire disclosure of which is hereby incorporated by reference in its entirety.

BACKGROUND

In a computing environment implementing a zero-knowledge architecture, user data may be encrypted such that a user device may be able to access the user data, while other computing devices in the computing environment may be unable to do so. However, it may be difficult to provide data recovery and/or password reset functionality while still implementing a zero-knowledge architecture.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to master password reset in a zero-knowledge architecture. A master password reset may be used to regain access to encrypted user data despite not having access to the master password associated with decrypting the user data. As an example, the user data may be encrypted using a local ciphering key, wherein the local ciphering key may be encrypted using a master password to generate a first encrypted local ciphering key that may be stored. The local ciphering key may also be encrypted using a recovery key to generate a second encrypted local ciphering key, which may also be stored. The recovery key may then be stored by a third party, such as a trusted third party.

In a reset scenario in which the master password is forgotten, the recovery key may be retrieved from the third party and used to decrypt the second encrypted local ciphering key, thereby providing access to the encrypted user data (e.g., via the decrypted local ciphering key), even though it may not be possible to decrypt the first encrypted local ciphering key due to the forgotten master password. In some examples, the first encrypted local ciphering key may be replaced with a newly-encrypted local ciphering key that was encrypted using a new master password. In other examples, the local ciphering key itself may be replaced with a new local ciphering key, which may be used to re-encrypt the user data and be encrypted and stored as described above. As a result, the user data may be recovered, whereas previous techniques may have instead determined the user data to be unrecoverable once the master password was forgotten.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an overview of an example system for master password reset in a zero-knowledge architecture.

FIGS. 4A-4B illustrate an overview of an example method for preserving access to user data in a zero-knowledge architecture.

FIGS. 4C-4D illustrate an overview of an example method for recovering access to user data in a zero-knowledge architecture.

DETAILED DESCRIPTION

Figure 2A:
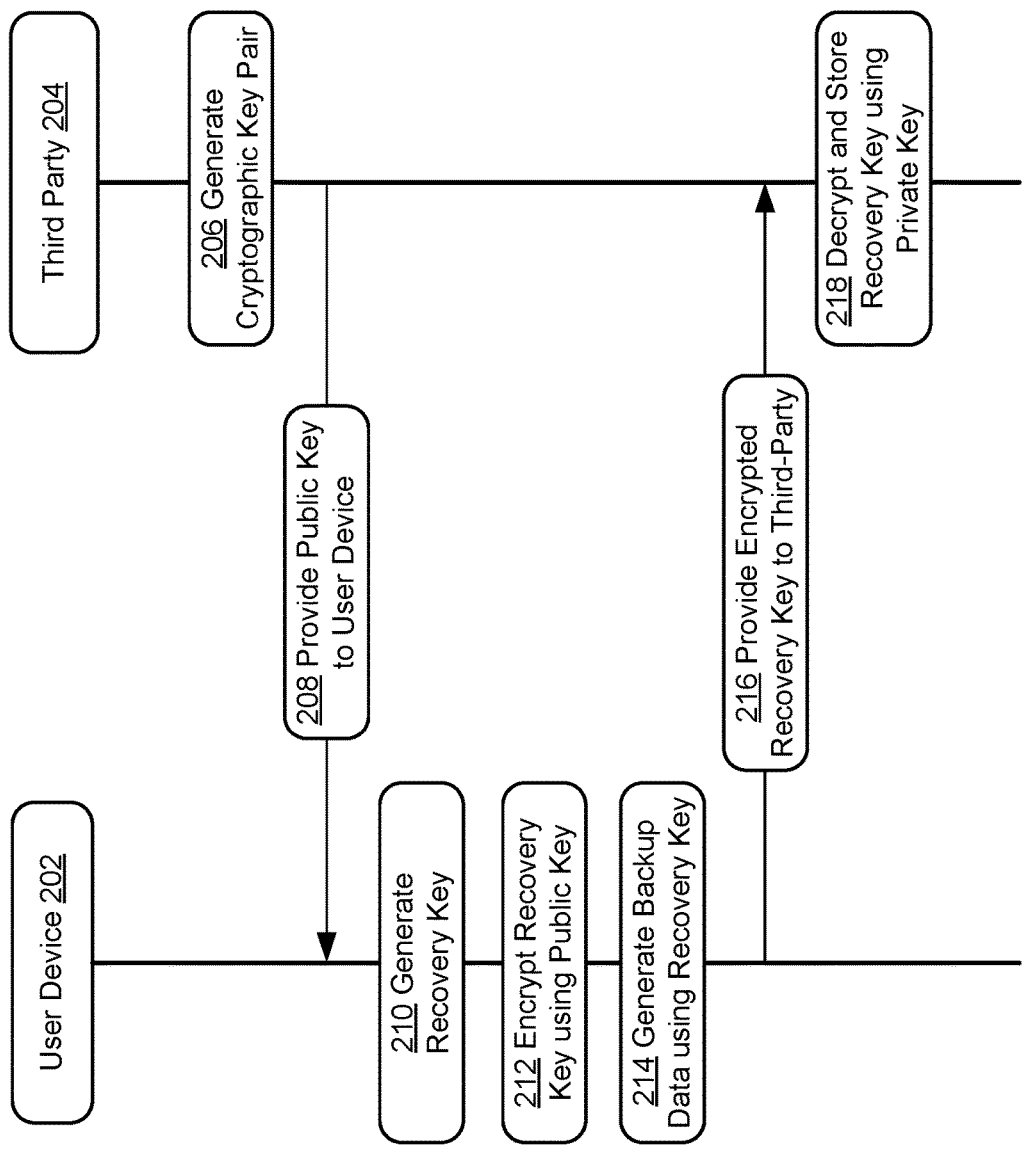
FIG. 2A illustrates an overview of an example method for creating a backup of user data in a zero-knowledge architecture.

Servers in a computing environment may store and/or transfer user data in order to offer functionality to user devices in the computing environment. As an example, a user having multiple devices may use, e.g., a note-taking service to synchronize notes across each of the user's devices. Accordingly, the note-taking service may store user data (e.g., notes, folders, etc.) using one or more servers in order to provide cross-device synchronization. In order to ensure that access to the user data is only granted to the user, the note-taking service may protect user data using authentication credentials. However, the user may forget or misplace the authentication credentials, thereby causing the user data to be inaccessible to the user. As a result, the note-taking service may offer reset or recovery functionality, wherein the note-taking service may assist the user in recovering the authentication credentials or create new authentication credentials in order to restore access to the user data. Such functionality may be possible because, regardless of the authentication credentials, the user data may be accessible to at least the note-taking service. This, however, requires the note-taking service to store the user's credentials, which creates a security risk if the note-taking service is hacked or otherwise subject to unauthorized access. It should be apparent to those of skill in the art that the present systems and methods are useful with any type of application/service and user data, including, e.g., services that store sensitive user data, such as password managers. Indeed, if a service storing sensitive user data is subject to unauthorized access, a user's sensitive data may be leaked.

By contrast, a "zero-knowledge" architecture may reduce, limit, or remove such access to user data. For example, a service handling sensitive data (e.g., passwords, identification or financial information, etc.) may implement a zero-knowledge architecture, wherein the service does not have access to user data stored or transmitted by servers in the computing environment implementing the service. In an example, the user data may be encrypted by a user device prior to being provided to the service and may be decrypted by the user device for access by the user. As a result of such encryption techniques, the user data provided to and/or processed by the service may be opaque to other computing devices (e.g., one or more services or servers, devices of other users of the service, etc.), such that the service may be unable to access the plaintext content of the user data, and may instead only have access to the encrypted representation of the user data.

In such an example, the user data may be opaque to the service as a result of the user device managing and/or storing the cryptographic keys used to encrypt and decrypt the user data. Thus, if the cryptographic keys are no longer useable by the user device (e.g., as a result of being password protected by a forgotten password or stored on a lost device, etc.), the user data may be irretrievable by the user or the service. Accordingly, aspects disclosed herein relate to master password reset in a zero-knowledge architecture, wherein the user data may still be retrievable by the user. As will be discussed in greater detail below, a recovery cryptographic key may be used to encrypt recovery data and provided to a trusted third party for storage. In a subsequent reset scenario, the recovery cryptographic key may be retrieved from the trusted third party and may be used to decrypt the recovery data. In some examples, the trusted third party may verify the identity of the user prior to providing the recovery cryptographic key. The recovery data may be a copy of at least a part of the user data, a cryptographic key used to encrypt the data, and/or a password used by the user to encrypt the user data, among other examples. The decrypted recovery data may then be used to restore access to the user data, thereby enabling the user to regain access to the user data while still maintaining aspects of the zero-knowledge architecture described above.

A trusted third party may be any of a variety of entities, including, but not limited to, a computing device associated with an administrator, an email account or mobile device of a person trusted by a user, or one or more computing devices of a third-party service. In an example, the trusted third party may store a recovery key for use by the user in a reset scenario, such that the recovery key may be provided to a device of the user. The trusted third party may perform identity verification prior to providing the recovery key. As an example, an email message may be sent to an email account of the user, such that the user may confirm ownership of the email account in order to verify his or her identity. In another example, a text message may be sent to a mobile device of the user. In some examples, an authentication code may be displayed to the user by a computing device, which the user may provide to the trusted third party in order to confirm control and/or possession of the computing device. While example identity verification techniques are described herein, it will be appreciated that alternative or additional techniques may be used.

FIG. 1 illustrates an overview of an example system 100 for master password reset in a zero-knowledge architecture. As illustrated, system 100 comprises user computing device 102, server 104, and third-party computing device 106. User computing device 102 may be a mobile computing device, a tablet computing device, a laptop computing device, a desktop computing device, or a personal computing device, among other computing devices. Server 104 may be a computing device, including, but not limited to, a desktop computing device, a server computing device, or a distributed computing device, among other computing devices. In an example, third-party computing device 106 may also be any of a variety of computing devices according to aspects disclosed herein. While each of user computing device 102, server 104, and third-party computing device 106 are illustrated as one element in system 100, it will be appreciated that any number of computing devices may be used to provide the functionality discussed herein.

User computing device 102, server 104, and third-party computing device 106 may be communicatively connected using network 108. In an example, network 108 may be a local-area network, a wide-area network, or the Internet, among other networks. In some examples, user computing device 102 may communicate with server 104 and/or third-party computing device 106 by way of network 108. Similarly, server 104 may communicate with third-party computing device 106 by way of network 108. While example communications between user computing device 102, server 104, and third-party computing device 106 are discussed herein, it will be appreciated that other examples may comprise alternative communications. As an example, user computing device 102 may be described to communicate with third-party computing device 106 by way of server 104, but, in some examples, user computing device 102 may communicate directly with third-party computing device 106 by way of network 108.

User computing device 102 comprises application 110, data store 112, and encrypted data 114. Application 110 may be used by a user of user computing device 102 to access a service provided by server 104. As an example, application 110 may be a password manager that synchronizes with server 104 and with one or more other user computing devices (e.g., user computing device 103) via server 104. As illustrated, user computing device 103 comprises application 105. Server 104 may, e.g., run a synchronization service that cause replication of user data among user computing devices 102 and 103. For example, user data generated by application 110 of user computing device 102 may be provided to server 104 for replication to user computing device 103, thereby causing application 105 to be able to access at least a part of the user data. Conversely, user data of application 105 on user computing device 103 may be replicated by server 104, thereby making the user data available to application 110 of user computing device 102. In some examples, applications 110 and 105 may store and/or access user data from client data store 116. In another example, application 110 may be a secure messaging application that communicates with other users of the secure messaging application using server 104. It will be appreciated that any of a variety of applications and/or services may be used according to aspects disclosed herein. Further, while only two user devices 102 and 103 are illustrated in system 100, it will be appreciated that any number of user devices may be used according aspects disclosed herein. One or more copies of user data from application 110 may be stored locally in data store 112 and/or remotely in client data store 116. In examples, a data store may comprise a storage device (e.g., a hard drive, a flash drive, etc.), a database, or a file server, among other data stores.

In an example, user data stored in data store 112 and/or client data store 116 may be encrypted using a master password, a cryptographic key, or a combination thereof. In some examples, a cryptographic key may be a symmetric key, or it may be an asymmetric key pair comprised of a public key and a private key. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others. Data in data store 112 and/or client data store 116 may be accessed by application 110, wherein application 110 may prompt a user of user computing device 102 for a password, a cryptographic key, or any combination thereof, among other authentication information. Based on the received authentication information, application 110 may be able to decrypt the user data and provide functionality based on the decrypted data. In alternative zero-knowledge architectures, loss of the authentication information may render user data stored in data store 112 and/or client data store 116 unavailable to the user.

According to aspects disclosed herein, encrypted data 114 may comprise recovery data, which may be used by application 110 to regain access to user data stored by data store 112 and/or client data store 116 in a reset scenario. In an example, encrypted data 114 may comprise an encrypted password, an encrypted cryptographic key, and/or an encrypted backup copy of at least a part of data store 112 and/or client data store 116. As an example, a master password, cipher, and/or cryptographic key may be used to encrypt or decrypt data stored by data store 112 and/or client data store 116. Encrypted data 114 may be encrypted by a cryptographic key, wherein application 110 may generate the cryptographic key, which may be used to generate encrypted data 114. Encrypted data 114 may be stored by user computing device 102, while the cryptographic key may be provided to third-party computing device 106 for storage in cryptographic key data store 118. Thus, an unencrypted representation of encrypted data 114 (e.g., as may be generated using the cryptographic key) may be unavailable to server 104, thereby maintaining aspects of the zero-knowledge architecture described herein.

In order to access information stored as encrypted data 114, the cryptographic key may be retrieved from third-party computing device 106. In an example, third-party computing device 106 may verify the identity of user computing device 102 and/or a user of user computing device 102 before providing the cryptographic key from cryptographic key data store 118. In some examples, application 110 may communicate with third-party computing device 106 indirectly (e.g., by way of sever 104). Communicating indirectly with third-party computing device 106 may improve scalability in examples with a large number of user computing devices.

Once the cryptographic key is retrieved from third-party computing device 106, application 110 may decrypt data stored as encrypted data 114. As discussed above, the data may comprise a password, a cryptographic key, or a backup of data stored by data store 112 and/or client data store 116. The decrypted data may be used by application 110 to enable the user to regain access to the user data. As an example, if encrypted data 114 comprises a password, the password may be provided to the user, or may be used to facilitate a password change operation. In another example, if encrypted data 114 comprises a cryptographic key associated with the user data, the cryptographic key may be used to decrypt at least a part of the user data stored by data store 112 and/or client data store 116. In some examples, if encrypted data 114 comprises a backup copy, the backup may be used to restore or update at least a part of data store 112 and/or client data store 116.

FIG. 2A illustrates an overview of an example method for creating a backup of user data in a zero-knowledge architecture. FIG. 2A illustrates a process flow between user device 202 and third party 204. In examples, one or more of the operations disclosed as being performed by user device 202 and third party 204 may be performed by one or multiple physical devices and/or networks. In an example, user device 202 may be user computing device 102 in FIG. 1. User device 202 may be a mobile computing device, a tablet computing device, a laptop computing device, a desktop computing device, or a personal computing device, among other computing devices. In some examples, third party 204 may be third-party computing device 106 in FIG. 1. Third party 204 may be any of a variety of entities, including, but not limited to, a computing device associated with an administrator, an email account or mobile device of a person trusted by a user, or one or more computing devices of a service. The method depicted in FIG. 2A is illustrated as a set of operations occurring at and/or between user device 202 and third party 204. It will be appreciated that communication between user device 202 and third party 204 may occur using a network (e.g., network 108 in FIG. 1), by way of one or more intermediate devices (e.g., server 104 in FIG. 1), or any combination thereof.

Flow begins at operation 206, where a third party cryptographic key pair may be generated. The third party cryptographic key pair may comprise a third party public cryptographic key and a third party private cryptographic key, wherein the public key may be useable to encrypt data, while the private key may be useable to decrypt data that was encrypted using the public key. Moving to operation 208, the third party public cryptographic key may be provided to user device 202. Providing the third party public cryptographic key may comprise sending the third party public cryptographic key using a communication protocol (e.g., UDP, TCP, HTTP, etc.), as part of an electronic message (e.g., an email, an instant message, etc.), or storing the third party public cryptographic key in a data store, among other techniques. In some examples, operations 206 and 208 may be performed to provide a secure mechanism by which to communicate information between user device 202 and third party 204. Accordingly, it will be appreciated that other examples may utilize other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.). In some examples, operations 206, 208, and 212 may be omitted, such that information may be transmitted in plaintext.

At operation 210, a recovery key may be generated. In normal operation, user data used by an application may be encrypted using a master password and stored in data store 112 and/or client data store 116 for use by application 110 in FIG. 1. Backup data may be replicated and stored in a backup data store and may be encrypted using a recovery key to generate backup data. In a reset scenario (e.g., if a user forgets the master password used to decrypt the user data), the backup data may be decrypted using the recovery key in order to regain access to the decrypted representation of the backed up user data. In an example, the recovery key may comprise a symmetric cryptographic key, wherein the symmetric cryptographic key may be used to encrypt and decrypt backup data. In another example, the recovery key may comprise an asymmetric cryptographic key pair, wherein the public cryptographic key may be used to encrypt backup data, while the private cryptographic key may be used to decrypt backup data.

Flow progresses to operation 212, where the recovery key may be encrypted using the third party public key that was received by user device 202 at operation 208. In an example, encrypting the recovery key may comprise encrypting the symmetric cryptographic key that was generated at operation 210. In another example, encrypting the recovery key may comprise encrypting the private key of the asymmetric cryptographic key pair that was generated at operation 210. It will be appreciated that while example cryptographic techniques have been discussed herein, alternate or additional cryptographic techniques may be used.

Moving to operation 214, backup data may be generated using the recovery key. Generating backup data may comprise encrypting at least a part of user data, as may be stored, e.g., in data store 112 and/or client data store 116 in the example system of FIG. 1. In an example, the backup data may be encrypted using a symmetric cryptographic key that was generated at operation 210. In another example, the backup data may be encrypted using the public cryptographic key of an asymmetric cryptographic key pair that was generated at operation 210. In some examples, the backup data may be synchronized with the user data by updating it periodically or when a part of the user data changes. The backup data may be stored locally or may be stored remotely (e.g., using a network-attached storage device, a cloud-based storage system, etc.).

At operation 216, the encrypted recovery key may be provided to third party 204. In some examples, the recovery key may not be retained by user device 202, such that it may not be possible to decrypt the backup data without first retrieving the recovery key from third party 204. In another example, the recovery key may be encrypted using the master password, such that the result may be retained by user device 202. As a result, user device 202 may generate updated or new backup data using the stored master-password encrypted recovery key. In some examples, the public key of an asymmetric key pair may be retained by user device 202, thereby enabling user device 202 to generate updated or new backup data. In such examples, the private key of the asymmetric key pair may be the recovery key. As such, the private key may have been encrypted at operation 212 and may be retained by the third party, such that the backup data may not be decrypted without first retrieving the recovery key from third party 204.

Flow progresses to operation 218, where the recovery key may be decrypted by third party 204 using the third party private cryptographic key and stored. In some examples, storing the recovery key may comprise associating the recovery key with an identifier (e.g., an identifier associated with user device 202, a user of user device 202, etc.) to indicate that the recovery key is associated with backup data stored by user device 202 and/or associated with a user of user device 202. It will be appreciated that, in an example, the recovery key may be stored using an encrypted representation. Flow terminates at operation 218.

Figure 2B:
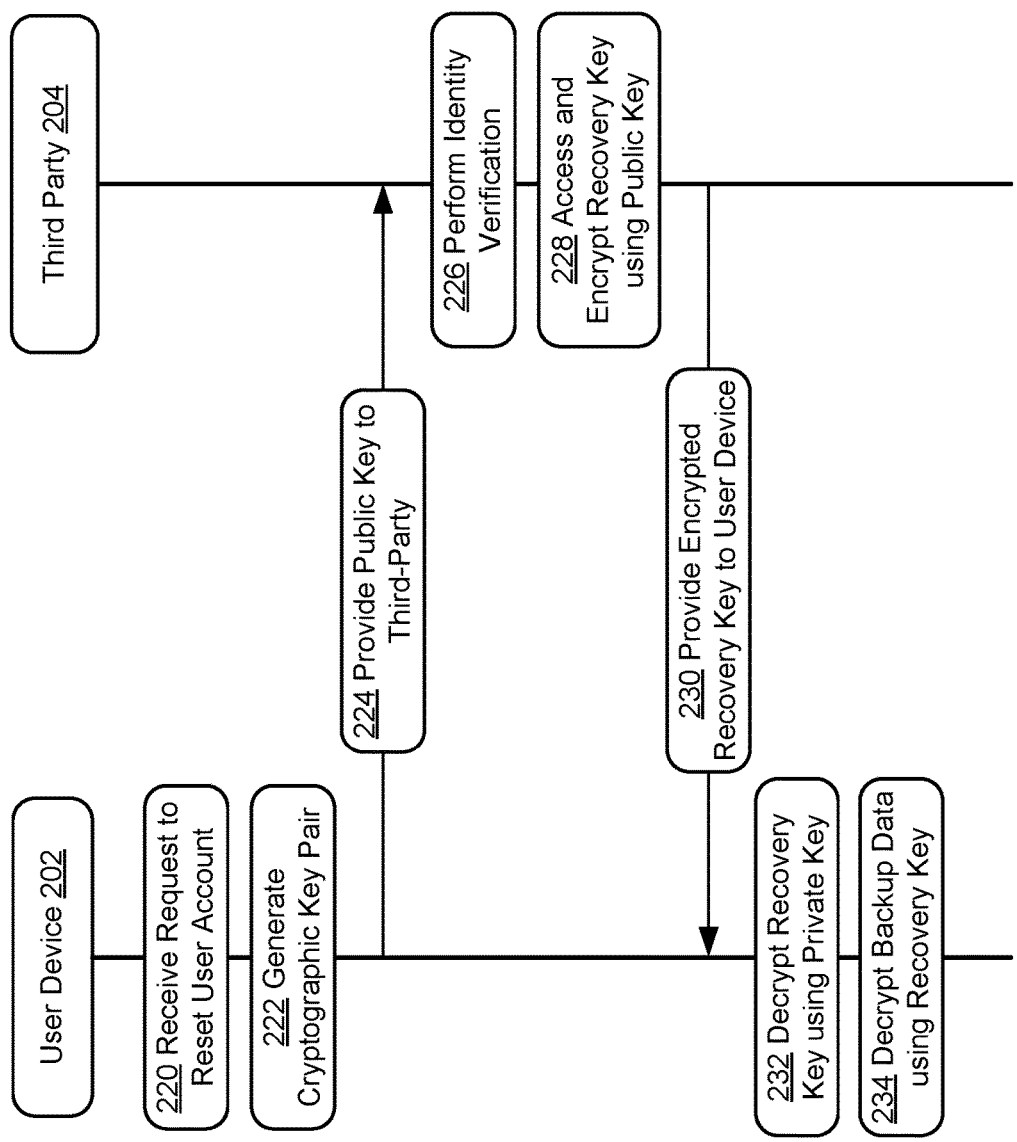
FIG. 2B illustrates an overview of an example method for recovering a backup of user data in a zero-knowledge architecture.

FIG. 2B illustrates an overview of an example method for recovering a backup of user data in a zero-knowledge architecture. FIG. 2B comprises user device 202 and third party 204. In an example, user device 202 may be user computing device 102 in FIG. 1. User device 202 may be a mobile computing device, a tablet computing device, a laptop computing device, a desktop computing device, or a personal computing device, among other computing devices. In some examples, third party 204 may be third-party computing device 106 in FIG. 1. Third party 204 may be any of a variety of entities, including, but not limited to, a computing device associated with an administrator, an email account or mobile device of a person trusted by a user, or one or more computing devices of a service. The method depicted in FIG. 2B is illustrated as a set of operations occurring at and/or between user device 202 and third party 204. It will be appreciated that communication between user device 202 and third party 204 may occur using a network (e.g., network 108 in FIG. 1), by way of one or more intermediate devices (e.g., server 104 in FIG. 1, a data store such as a hard drive or flash drive, etc.), or any combination thereof.

Flow begins at operation 220, where a request to reset a user account may be received. The request may be received as a result of a user interacting with a user interface displayed by user device 202. In some examples, the reset request may be in response to a user forgetting a password or losing access to a cryptographic key used to access user data (e.g., as may be stored by data store 112 and/or client data store 116 in FIG. 1), among other reset scenarios. At operation 222, a user device cryptographic key pair may be generated. The user device cryptographic key pair may comprise a user device public cryptographic key and a user device private cryptographic key, wherein the public key may be useable to encrypt data, while the private key may be useable to decrypt data that was encrypted using the public key.

Moving to operation 224, the user device public cryptographic key may be provided to third party 204. The user device public cryptographic key may be provided as part of a request for a recovery key stored by third party 204. Providing the user device public cryptographic key may comprise sending the user device public cryptographic key using a communication protocol (e.g., UDP, TCP, HTTP, etc.), as part of an electronic message (e.g., an email, an instant message, etc.), or storing the user device public cryptographic key in a data store, among other techniques. In some examples, operations 222 and 224 may be performed to provide a secure mechanism by which to communicate information between third party 204 and user device 202. Accordingly, it will be appreciated that other examples may utilize other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.). In some examples, operations 222, 224, and 228 may be omitted, such that information may be transmitted in plaintext.

At operation 226, identity verification may be performed. Identity verification may comprise issuing an authentication challenge to user device 202 (e.g., requesting a password, biometric identification, providing a token to a user of user device 202 and prompting for receipt of that token, etc.). In some examples, an identifier (e.g., associated with user device 202 and/or a user of user device 202, etc.) may have been provided with the public key at operation 224, such that the received identifier may be compared against an identifier that was previously associated with a requested recovery key. In some examples, the identifier may be used by third party 204 to identify a stored recovery key that is associated with the user and/or user device 202. In other examples, identity verification may be performed manually by a person, wherein third party 204 may request or indicate that the person interact with a user of user device 202. As an example, the person may communicate with the user (e.g., via an email or instant messaging platform, social media, or a telephone or video call, etc.) to confirm the user's identity (e.g., by asking personal questions, based on a familiarity with the user, etc.). Once the user's identity has been confirmed by the person, the person may provide an indication to third party 204, which may continue as discussed below. It will be appreciated that alternative or additional identity verification techniques may be used or, in some examples, may be omitted.

If identity verification succeeds, flow progresses to operation 228 where the recovery key may be accessed and encrypted. In some examples, the recovery key may be encrypted using the user device public key that was received at operation 224. As discussed above, alternative techniques may be used to secure the recovery key, or the recovery key may be transmitted in plaintext. At operation 230, the encrypted recovery key may be provided to the user device. Providing the encrypted recovery key may comprise sending the encrypted recovery key using a communication protocol (e.g., UDP, TCP, HTTP, etc.), as part of an electronic message (e.g., an email, an instant message, etc.), or storing the encrypted recovery key in a data store, generating a physical representation of the encrypted recovery (e.g., a printed paper copy, a quick response code, etc.), among other techniques. It will be appreciated that other examples may use other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.).

At operation 232, the recovery key may be decrypted using the user device private cryptographic key of the cryptographic key pair that was generated at operation 222. Accordingly, the decrypted recovery key may be used at operation 234 to decrypt backup data. As described herein, the backup data may comprise a backup copy of user data used by an application of user device 202 (e.g., data stored in data store 112 and/or client data store 116 used by application 110 in FIG. 1). The decrypted backup data may be used to replace or update user data that may be inaccessible as a result of the user forgetting a password and/or losing a cryptographic key. Thus, the user may be able to set a new master password or use a new cryptographic key, re-encrypt the user data using the new master password, and resume using the user data, whereas, traditionally, the user data may have been lost. Flow terminates at operation 232.

Figure 3A:
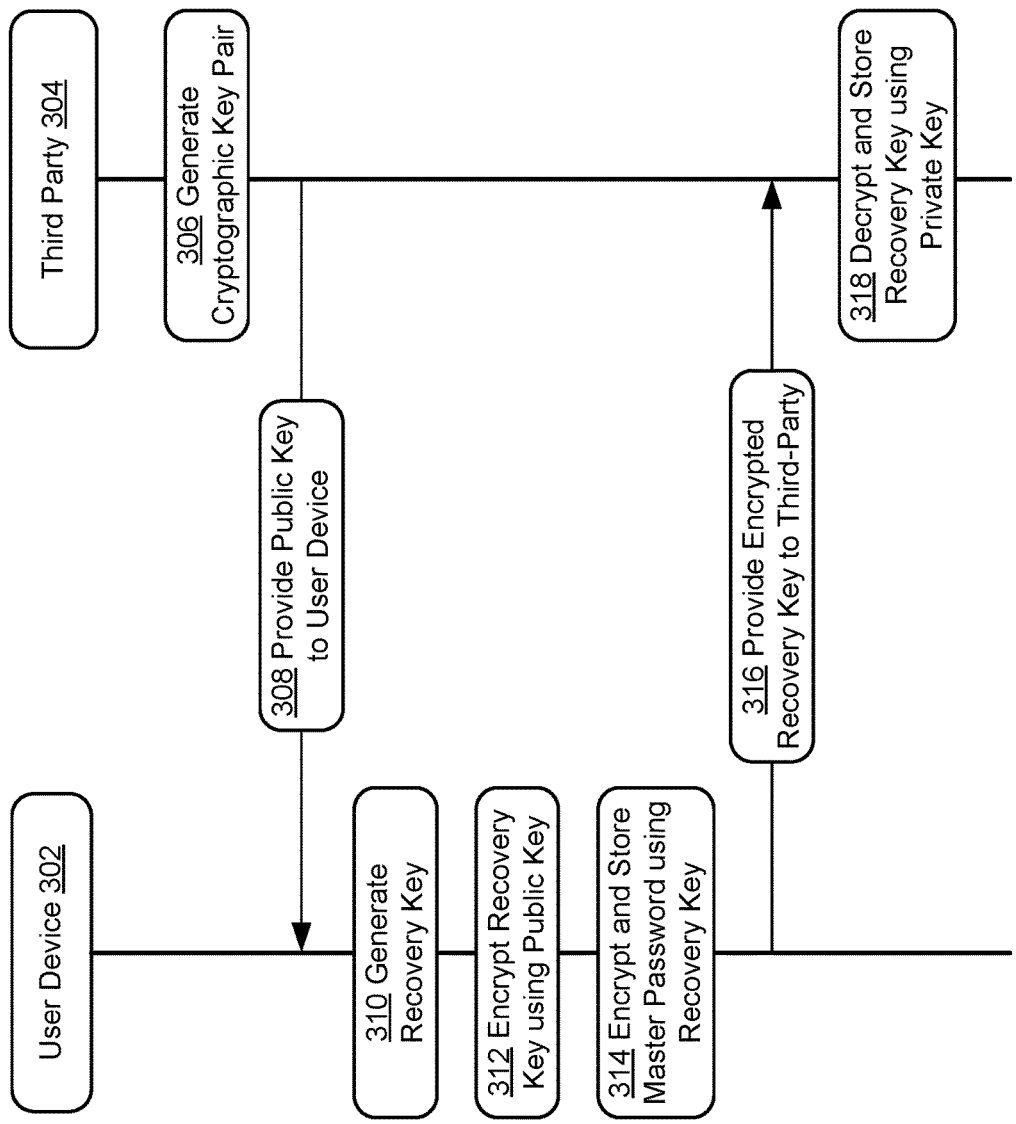
FIG. 3A illustrates an overview of an example method for creating a backup of a master password in a zero-knowledge architecture.

FIG. 3A illustrates an overview of an example method for creating a backup of a master password in a zero-knowledge architecture. FIG. 3A illustrates a process flow between user device 302 and third party 304. In examples, one or more of the operations disclosed as being performed by user device 302 and third party 304 may be performed by one or multiple physical devices and/or networks. In an example, user device 302 may be user computing device 102 in FIG. 1. User device 302 may be a mobile computing device, a tablet computing device, a laptop computing device, a desktop computing device, or a personal computing device, among other computing devices. In some examples, third party 304 may be third-party computing device 106 in FIG. 1. Third party 304 may be any of a variety of entities, including, but not limited to, a computing device associated with an administrator, an email account or mobile device of a person trusted by a user, or one or more computing devices of a service. The method depicted in FIG. 3A is illustrated as a set of operations occurring at and/or between user device 302 and third party 304. It will be appreciated that communication between user device 302 and third party 304 may occur using a network (e.g., network 108 in FIG. 1), by way of one or more intermediate devices (e.g., server 104 in FIG. 1), or any combination thereof.

Flow begins at operation 306, where a third party cryptographic key pair may be generated. The third party cryptographic key pair may comprise a third party public cryptographic key and a third party private cryptographic key, wherein the public key may be useable to encrypt data, while the private key may be useable to decrypt data that was encrypted using the public key. Moving to operation 308, the third party public cryptographic key may be provided to user device 302. Providing the third party public cryptographic key may comprise sending the third party public cryptographic key using a communication protocol (e.g., UDP, TCP, HTTP, etc.), as part of an electronic message (e.g., an email, an instant message, etc.), or storing the third party public cryptographic key in a data store, among other techniques. In some examples, operations 306 and 308 may be performed to provide a secure mechanism by which to communicate information between user device 302 and third party 304. Accordingly, it will be appreciated that other examples may utilize other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.). In some examples, operations 306, 308, and 312 may be omitted, such that information may be transmitted in plaintext.

At operation 310, a recovery key may be generated. In an example, the recovery key may comprise a symmetric cryptographic key, wherein the symmetric cryptographic key may be used to encrypt and decrypt a master password. In another example, the recovery key may comprise an asymmetric cryptographic key pair, wherein the public cryptographic key may be used to encrypt the master password, while the private cryptographic key may be used to decrypt the master password. Flow progresses to operation 312, where the recovery key may be encrypted using the third party public key that was received by user device 302 at operation 308. In an example, encrypting the recovery key may comprise encrypting the symmetric cryptographic key that was generated at operation 310. In another example, encrypting the recovery key may comprise encrypting the private key of the asymmetric cryptographic key pair that was generated at operation 310. It will be appreciated that while example cryptographic techniques have been discussed herein, alternate or additional cryptographic techniques may be used.

Moving to operation 314, a master password may be encrypted to generate recovery data (in this example, the encrypted master password), wherein the master password may be used to secure user data (e.g., data stored in data store 112 and/or client data store 116 in the example system of FIG. 1). In an example, the recovery data may be encrypted using a symmetric cryptographic key that was generated at operation 310. In another example, the recovery data may be encrypted using the public cryptographic key of an asymmetric cryptographic key pair that was generated at operation 310. In some examples, the recovery data may be updated when the master password used to encrypt the user data is changed. The recovery data may be stored locally or may be stored remotely (e.g., using a network-attached storage device, a cloud-based storage system, etc.).

At operation 316, the encrypted recovery key may be provided to third party 304. In some examples, the recovery key may not be retained by user device 302, such that it may not be possible to decrypt the recovery data without first retrieving the recovery key from third party 304. In another example, the recovery key may be encrypted using the master password, such that the result may be retained by user device 302. As a result, user device 302 may generate updated or new recovery data using the stored master-password encrypted recovery key. In such an example, the recovery data may not be decrypted without first decrypting the recovery key using the master password (or, as discussed above, retrieving the recovery key from third party 304). In some examples, the public key of an asymmetric key pair may be retained by user device 302, thereby enabling user device 302 to generate updated or new recovery data. In such examples, the private key of the asymmetric key pair may be the recovery key. As such, the private key may have been encrypted at operation 312 and may be retained by the third party, such that the recovery data may not be decrypted without first retrieving the recovery key from third party 304.

Flow progresses to operation 318, where the recovery key may be decrypted by third party 304 using the third party private cryptographic key and stored. In some examples, storing the recovery key may comprise associating the recovery key with an identifier (e.g., an identifier associated with user device 302, a user of user device 302, etc.) to indicate that the recovery key is associated with recovery data stored by user device 302 and/or associated with a user of user device 302. It will be appreciated that, in an example, the recovery key may be stored using an encrypted representation. Flow terminates at operation 318.

Figure 3B:
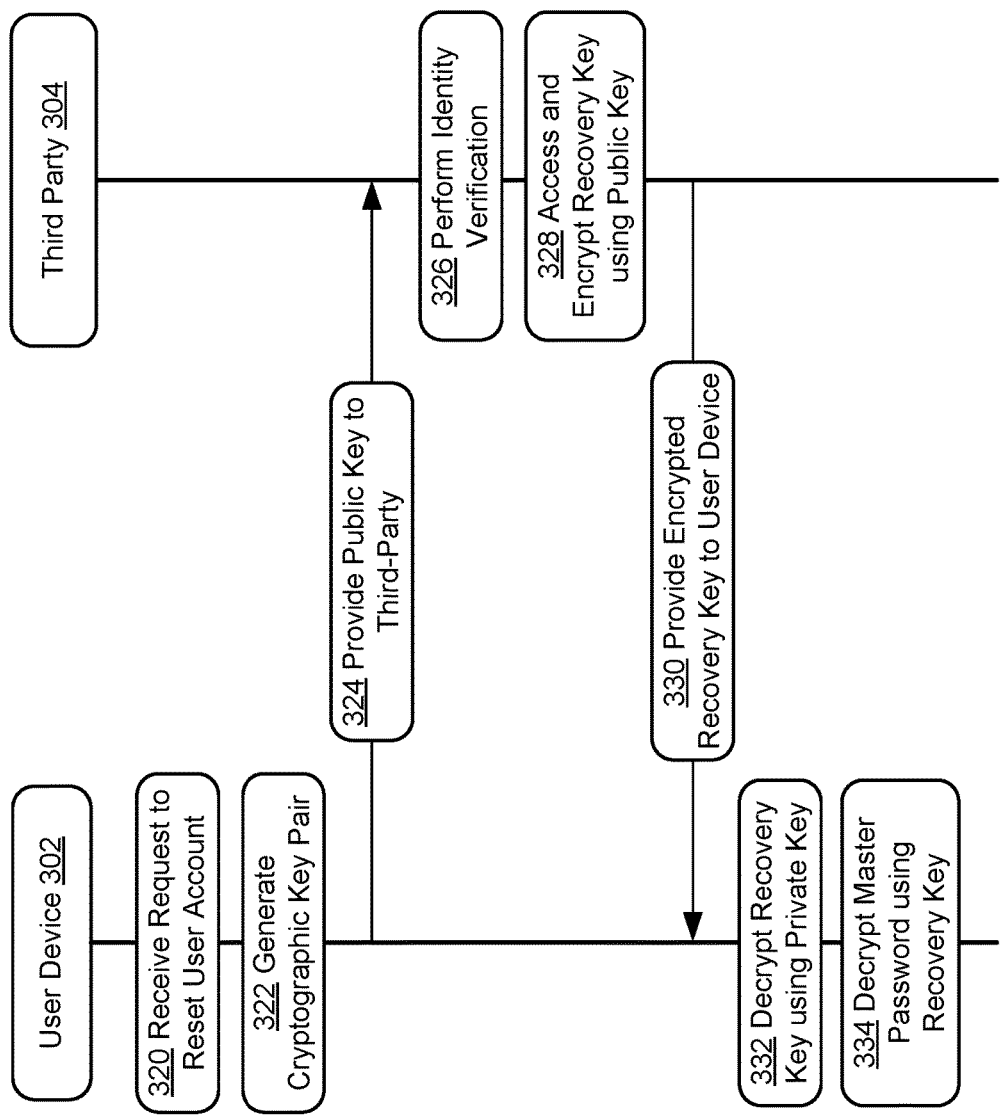
FIG. 3B illustrates an overview of an example method for recovering a backup of a master password in a zero-knowledge architecture.

FIG. 3B illustrates an overview of an example method for recovering a backup of a master password in a zero-knowledge architecture. FIG. 3B comprises user device 302 and third party 304. In an example, user device 302 may be user computing device 102 in FIG. 1. User device 302 may be a mobile computing device, a tablet computing device, a laptop computing device, a desktop computing device, or a personal computing device, among other computing devices. In some examples, third party 304 may be third-party computing device 106 in FIG. 1. Third party 304 may be any of a variety of entities, including, but not limited to, a computing device associated with an administrator, an email account or mobile device of a person trusted by a user, or one or more computing devices of a service. The method depicted in FIG. 3B is illustrated as a set of operations occurring at and/or between user device 302 and third party 304. It will be appreciated that communication between user device 302 and third party 304 may occur using a network (e.g., network 108 in FIG. 1), by way of one or more intermediate devices (e.g., server 104 in FIG. 1, a data store such as a hard drive or flash drive, etc.), or any combination thereof.

Flow begins at operation 320, where a request to reset a user account may be received. The request may be received as a result of a user interacting with a user interface displayed by user device 302. In some examples, the reset request may be in response to a user forgetting a password or losing access to a cryptographic key used to access user data (e.g., as may be stored by data store 112 and/or client data store 116 in FIG. 1), among other reset scenarios. At operation 322, a user device cryptographic key pair may be generated. The user device cryptographic key pair may comprise a user device public cryptographic key and a user device private cryptographic key, wherein the public key may be useable to encrypt data, while the private key may be useable to decrypt data that was encrypted using the public key.

Moving to operation 324, the user device public cryptographic key may be provided to third party 304. The user device public cryptographic key may be provided as part of a request for a recovery key stored by third party 304. Providing the user device public cryptographic key may comprise sending the user device public cryptographic key using a communication protocol (e.g., UDP, TCP, HTTP, etc.), as part of an electronic message (e.g., an email, an instant message, etc.), or storing the user device public cryptographic key in a data store, among other techniques. In some examples, operations 322 and 324 may be performed to provide a secure mechanism by which to communicate information between third party 304 and user device 302. Accordingly, it will be appreciated that other examples may utilize other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.). In some examples, operations 322, 324, and 328 may be omitted, such that information may be transmitted in plaintext.

At operation 326, identity verification may be performed. Identity verification may comprise issuing an authentication challenge to user device 302 (e.g., requesting a password, biometric identification, providing a token to a user of user device 302 and prompting for receipt of that token, etc.). In some examples, an identifier (e.g., associated with user device 302 and/or a user of user device 302, etc.) may have been provided with the public key at operation 324, such that the received identifier may be compared against an identifier that was previously associated with a requested recovery key. In some examples, the identifier may be used by third party 304 to identify a stored recovery key that is associated with the user and/or user device 302. In other examples, identity verification may be performed manually by a person, wherein third party 304 may request or indicate that the person interact with a user of user device 302. As an example, the person may communicate with the user (e.g., via an email or instant messaging platform, social media, or a telephone or video call, etc.) to confirm the user's identity (e.g., by asking personal questions, based on a familiarity with the user, etc.). Once the user's identity has been confirmed by the person, the person may provide an indication to third party 304, which may continue as discussed below. It will be appreciated that alternative or additional identity verification techniques may be used or, in some examples, may be omitted.

If identity verification succeeds, flow progresses to operation 328 where the recovery key may be accessed and encrypted. In some examples, the recovery key may be encrypted using the user device public key that was received at operation 324. As discussed above, alternative techniques may be used to secure the recovery key, or the recovery key may be transmitted in plaintext. At operation 330, the encrypted recovery key may be provided to the user device. Providing the encrypted recovery key may comprise sending the encrypted recovery key using a communication protocol (e.g., UDP, TCP, HTTP, etc.), as part of an electronic message (e.g., an email, an instant message, etc.), or storing the encrypted recovery key in a data store, among other techniques. It will be appreciated that other examples may use other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.).

At operation 332, the recovery key may be decrypted using the private cryptographic key of the cryptographic key pair that was generated at operation 322. Accordingly, the decrypted recovery key may be used at operation 334 to decrypt recovery data. As discussed above, the recovery data may comprise a master password used to encrypt user data (e.g., data stored in data store 112 and/or client data store 116 used by application 110 in FIG. 1). The decrypted recovery data may be used to recover a master password associated with user data and/or an application (e.g., application 110 in FIG. 1). In some examples, the master password may be used to reset the master password, such that the user may be prompted to enter a replacement master password. Thus, the user may be able to regain access to the user data, whereas, traditionally, the user data may have been lost. Flow terminates at operation 332.

Figure 4B:
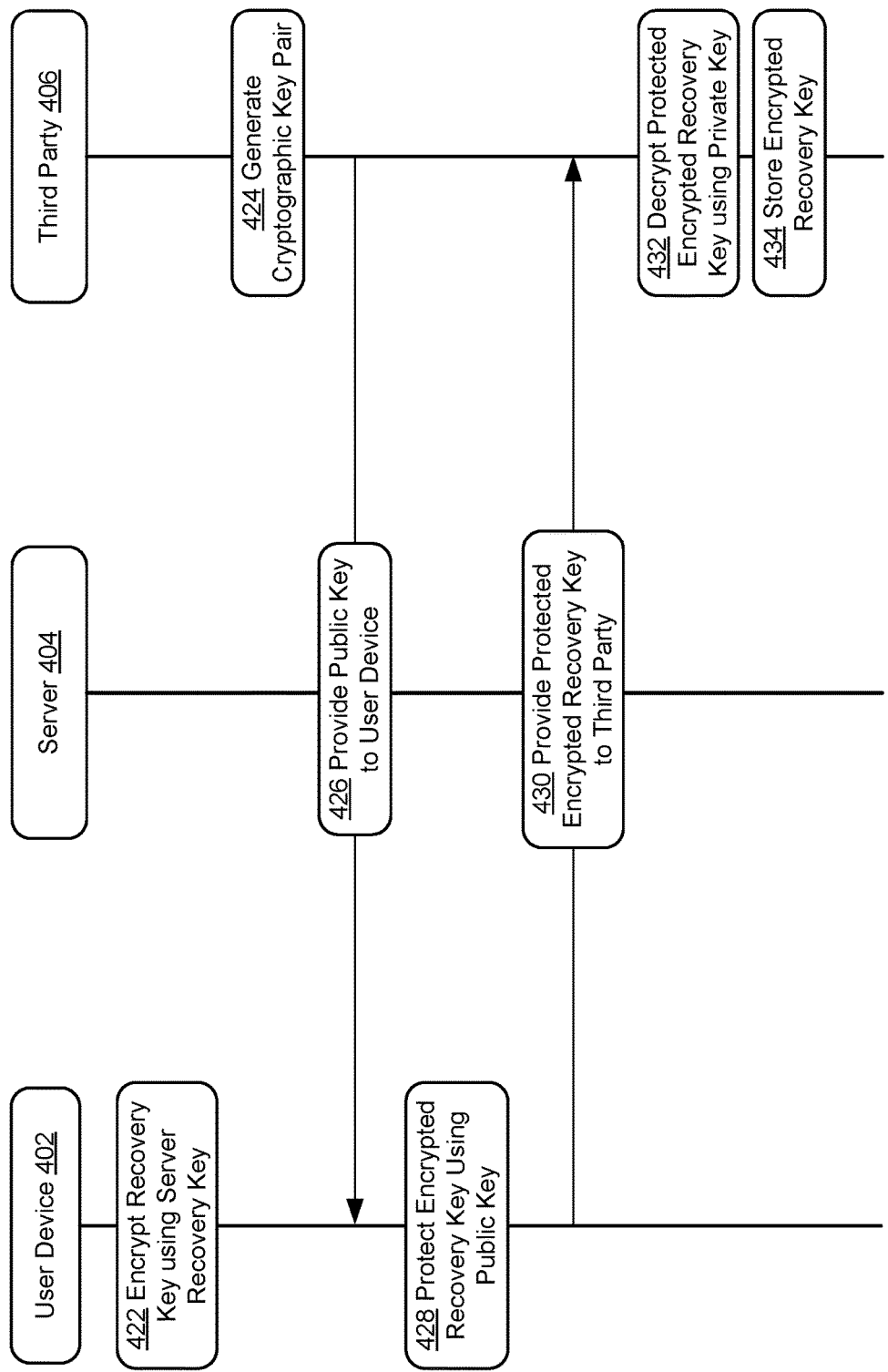

FIGS. 4A-4B illustrate an overview of an example method for preserving access to user data in a zero-knowledge architecture. FIGS. 4A-4B illustrate a process flow among user device 402, server 404, and third party 406. In examples, one or more of the operations disclosed as being performed by user device 402, server 404, and third party 406 may be performed by one or multiple physical devices and/or networks. In an example, user device 402 may be user computing device 102 in FIG. 1. User device 402 may be a mobile computing device, a tablet computing device, a laptop computing device, a desktop computing device, or a personal computing device, among other computing devices. In some examples, server 404 may be server 104 in FIG. 1. Server 404 may be a computing device, including, but not limited to, a desktop computing device, a server computing device, or a distributed computing device, among other computing devices. In other examples, third party 406 may be third-party computing device 106 in FIG. 1. Third party 406 may be any of a variety of entities, including, but not limited to, a computing device associated with an administrator, an email account or mobile device of a person trusted by a user, or one or more computing devices of a service. The method depicted in FIGS. 4A-4B is illustrated as a set of operations occurring at and/or between user device 402, server 404, and/or third party 406. It will be appreciated that communication between user device 402, server, 404, and/or third party 406 may occur using a network (e.g., network 108 in FIG. 1), by way of one or more intermediate devices (e.g., server 104 in FIG. 1), or any combination thereof.

With respect to FIG. 4A, flow begins at operation 408, where a local ciphering key may be generated. In an example, the local ciphering key may be a symmetric cryptographic key, wherein the local ciphering key may be used by user device 402 to encrypt and decrypt user data. In another example, the local ciphering key may be an asymmetric cryptographic key pair, wherein the public cryptographic key of the key pair may be used to encrypt user data, while the private cryptographic key of the key pair may be used to decrypt user data.

At operation 409, user data may be encrypted using the local ciphering key. For example, the user data may be data of an application of user device 402. The user data may be stored in an encrypted representation using the local ciphering key (e.g., as may be stored by data store 112 and/or client data store 116 in FIG. 1), such that the local ciphering key may be used to decrypt the user data when accessed by the application of user device 402.

Moving to operation 410, the local ciphering key may be encrypted using a master password, such that the encrypted representation of the local ciphering key may be stored. As a result, the master password may be used to decrypt the encrypted local ciphering key during normal operation, such that the decrypted local ciphering key may then be used to encrypt and/or decrypt user data. The additional layer of indirection may operate to enable a user to change the master password without needing to rekey encrypted user data. In another example, as will be discussed below, the local ciphering key may be recovered to regain access to user data without requiring the recovery of the master password, according to aspects disclosed herein.

At operation 412, a recovery key may be generated. In an example, the recovery key may comprise a symmetric cryptographic key, wherein the symmetric cryptographic key may be used to encrypt and decrypt the local ciphering key. In another example, the recovery key may comprise an asymmetric cryptographic key pair, wherein the public cryptographic key may be used to encrypt the local ciphering key, while the private cryptographic key may be used to decrypt the local ciphering key. Flow progresses to operation 414, where the local ciphering key may be encrypted using the recovery key, such that the encrypted representation of the local ciphering key may be stored. Thus, as a result of operations 410 and 414, the local ciphering key may be stored twice but encrypted in two different manners, wherein the first copy may be encrypted using the master password and the second copy may be encrypted using the recovery key. In some examples, the local ciphering key is not stored or retained in plaintext, such that accessing data encrypted using the local ciphering key may be conditioned on access to either the master password or the recovery key.

Moving to operation 416, a server recovery key may be generated. In an example, the server recovery key may comprise a symmetric cryptographic key, such that the symmetric cryptographic key may be used to encrypt and decrypt the recovery key generated at operation 412. In another example, the server recovery key may comprise an asymmetric cryptographic key pair, such that the server recovery public cryptographic key of the key pair may be used to encrypt the recovery key, while the server recovery private cryptographic key of the key pair may be used to decrypt the recovery key.

At operation 418, the server recovery key may be provided to server 404. In an example where the server recovery key comprises an asymmetric cryptographic key pair, providing the server recovery key may comprise providing only the server recovery private cryptographic key of the key pair. As discussed herein, the server recovery key may be provided to server 404 using a secure or insecure communication technique. Flow progresses to operation 420, where server 404 may store the server recovery key. In some examples, the server recovery key is not retained by user device 402, such that the server recovery must be requested from server 404. Storing the server recovery key may comprise associating the server recovery key with a unique identifier, wherein the unique identifier may be associated with user device 402 and/or a user of user device 402. It will be appreciated that other storage techniques may be used.

Turning now to FIG. 4B, flow continues to operation 422, where the recovery key may be encrypted using the server recovery key. As discussed above with respect to operation 416, in a symmetric cryptography example, the recovery key may be encrypted using the server recovery key, while in an asymmetric cryptography example, the recovery key may be encrypted using the public cryptographic key of the server recovery key. Given that the server recovery key may not be retained by user device 402, decrypting the recovery key may not be possible without first retrieving the server recovery key from server 404. It will be appreciated that while example cryptographic techniques have been discussed herein, alternate or additional cryptographic techniques may be used.

At operation 424, a third party cryptographic key pair may be generated. The third party cryptographic key pair may comprise a third party public cryptographic key and a third party private cryptographic key, wherein the public key may be useable to encrypt data, while the private key may be useable to decrypt data that was encrypted using the public key. Moving to operation 426, the third party public cryptographic key may be provided to user device 402. Providing the third party public cryptographic key may comprise sending the third party public cryptographic key using a communication protocol (e.g., UDP, TCP, HTTP, etc.), as part of an electronic message (e.g., an email, an instant message, etc.), or storing the third party public cryptographic key in a data store, among other techniques. In some examples, operations 424 and 426 may be performed to provide a secure mechanism by which to communicate information between third party 406 and user device 402. Accordingly, it will be appreciated that other examples may utilize other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.). In some examples, operations 424, 426, and 428 may be omitted, such that information may be transmitted in plaintext.

Flow progresses to operation 428, where the encrypted recovery key may be protected using the third party public key that was received by user device 402 at operation 426. It will be appreciated that while example cryptographic techniques have been discussed herein, alternate or additional cryptographic techniques may be used. At operation 430, the protected encrypted recovery key may be provided to third party 406. In some examples, the recovery key may not be retained by user device 402, such that it may not be possible to decrypt the local ciphering key without using either the master password, or retrieving the encrypted recovery key from third party 406 and the server recovery key from server 404.

Flow progresses to operation 432, where the protected encrypted recovery key may be decrypted using the third party private cryptographic key, such that the encrypted recovery key may be stored. In other examples, the encrypted recovery key is not decrypted using the third party public key of the third party until it is requested by the user device. In some examples, storing the encrypted recovery key may comprise associating the encrypted recovery key with an identifier (e.g., an identifier associated with user device 402, a user of user device 402, etc.) to indicate that the recovery key is associated with user device 402 and/or a user of user device 402. Flow terminates at operation 434.

Figure 4C:
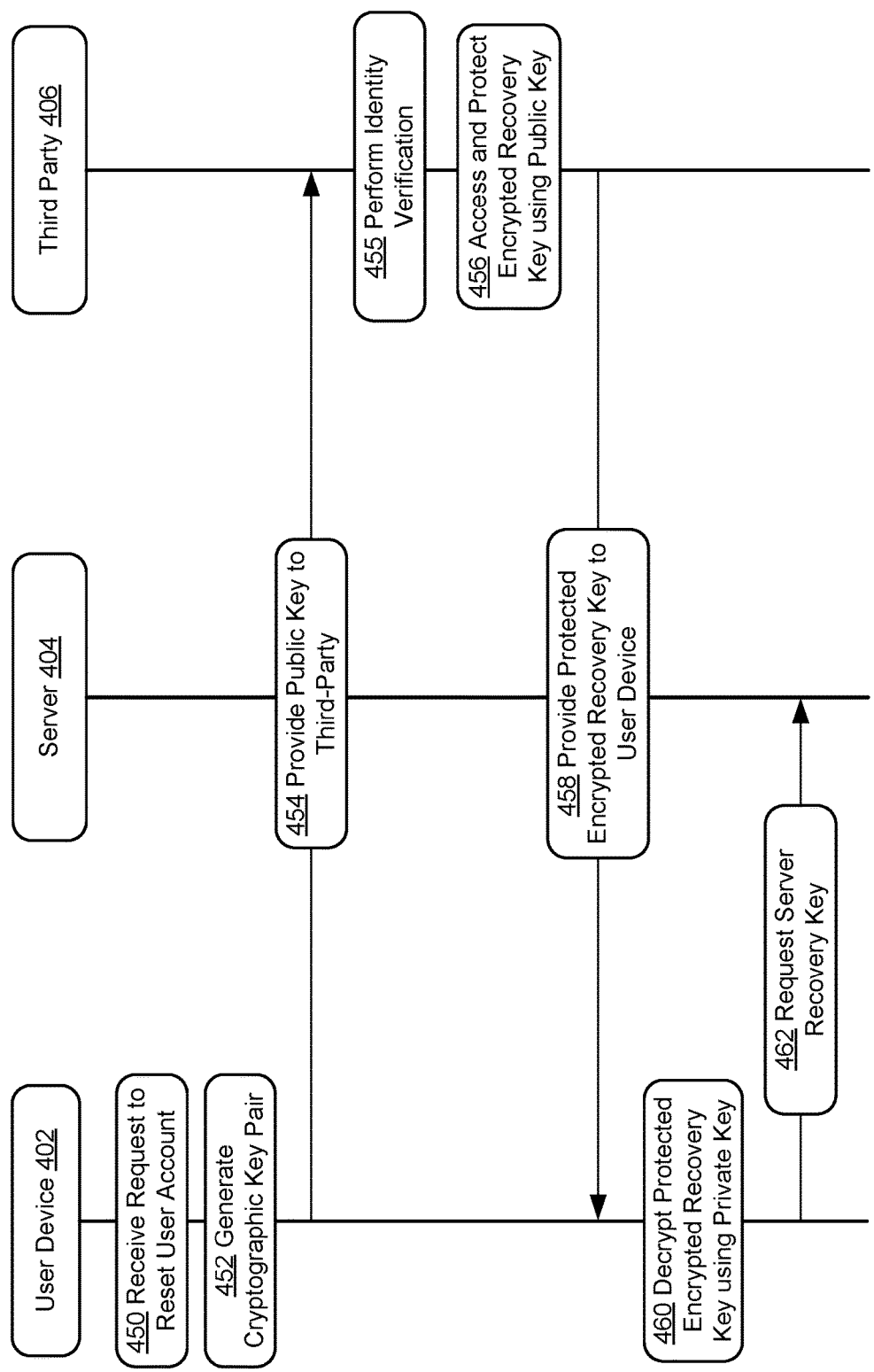

FIGS. 4C-4D illustrate an overview of an example method for recovering access to user data in a zero-knowledge architecture. FIGS. 4C-4D illustrate a process flow among user device 402, server 404, and third party 406. In examples, one or more of the operations disclosed as being performed by user device 402, server 404, and third party 406 may be performed by one or multiple physical devices and/or networks. In an example, user device 402 may be user computing device 102 in FIG. 1. User device 402 may be a mobile computing device, a tablet computing device, a laptop computing device, a desktop computing device, or a personal computing device, among other computing devices. In some examples, server 404 may be server 104 in FIG. 1. Server 404 may be a computing device, including, but not limited to, a desktop computing device, a server computing device, or a distributed computing device, among other computing devices. In other examples, third party 406 may be third-party computing device 106 in FIG. 1. Third party 406 may be any of a variety of entities, including, but not limited to, a computing device associated with an administrator, an email account or mobile device of a person trusted by a user, or one or more computing devices of a service. The method depicted in FIGS. 4C-4D is illustrated as a set of operations occurring at and/or between user device 402, server 404, and/or third party 406. It will be appreciated that communication between user device 402, server, 404, and/or third party 406 may occur using a network (e.g., network 108 in FIG. 1), by way of one or more intermediate devices (e.g., server 104 in FIG. 1), or any combination thereof.

With respect to FIG. 4C, flow begins at operation 450, where a request to reset a user account may be received. The request may be received as a result of a user interacting with a user interface displayed by user device 402. In some examples, the reset request may be in response to a user forgetting a password or losing access to a cryptographic key used to access user data (e.g., as may be stored by data store 112 and/or client data store 116 in FIG. 1), among other reset scenarios. At operation 452, a user device cryptographic key pair may be generated. The user device cryptographic key pair may comprise a user device public cryptographic key and a user device private cryptographic key, wherein the public key may be useable to encrypt data, while the private key may be useable to decrypt data that was encrypted using the public key.

Moving to operation 454, the user device public cryptographic key may be provided to third party 406. The user device public cryptographic key may be provided as part of a request for an encrypted recovery key stored by third party 406. Providing the user device public cryptographic key may comprise sending the user device public cryptographic key using a communication protocol (e.g., UDP, TCP, HTTP, etc.), as part of an electronic message (e.g., an email, an instant message, etc.), or storing the user device public cryptographic key in a data store, among other techniques. In some examples, operations 452 and 454 may be performed to provide a secure mechanism by which to communicate information between third party 406 and user device 402. Accordingly, it will be appreciated that other examples may utilize other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.). In some examples, operations 452-456 may be omitted, such that information may be transmitted in plaintext.

At operation 455, identity verification may be performed by third party 406. Identity verification may comprise issuing an authentication challenge to user device 402 (e.g., requesting a password, biometric identification, providing a token to a user of user device 402 and prompting for receipt of that token, etc.). As an example, the token may be provided in an email or text message sent to a device of the user. In some examples, an identifier (e.g., associated with user device 402 and/or a user of user device 402, etc.) may have been provided with the public key at operation 454, such that the received identifier may be compared against an identifier that was previously associated with a requested recovery key. In some examples, the identifier may be used by third party 406 to identify a stored recovery key that is associated with the user and/or user device 402. In other examples, identity verification may be performed manually by a person, wherein third party 406 may request or indicate that the person interact with a user of user device 402. As an example, the person may communicate with the user (e.g., via an email or instant messaging platform, social media, or a telephone or video call, etc.) to confirm the user's identity (e.g., by asking personal questions, based on a familiarity with the user, etc.). Once the user's identity has been confirmed by the person, the person may provide an indication to third party 406, which may continue as discussed below. It will be appreciated that alternative or additional identity verification techniques may be used or, in some examples, may be omitted.

Flow progresses to operation 456 where the encrypted recovery key may be accessed and protected. In some examples, the encrypted recovery key may be protected by encrypting it using the user device public key that was received at operation 454. In some examples, the encrypted recovery key may need to be decrypted with the private key of the third party before being re-encrypted with the user device public key received at operation 454. As discussed above, alternative techniques may be used to secure the recovery key, or the recovery key may be transmitted in plaintext.

At operation 458, the encrypted recovery key may be provided to the user device. Providing the encrypted recovery key may comprise sending the encrypted recovery key using a communication protocol (e.g., UDP, TCP, HTTP, etc.), as part of an electronic message (e.g., an email, an instant message, etc.), or storing the encrypted recovery key in a data store, among other techniques. It will be appreciated that other examples may utilize other techniques, including, but not limited to, symmetric cryptography based on a previously-exchanged cryptographic key or transmitting the cryptographic key using a pre-existing secure communication channel (e.g., a Secure Shell tunnel, an HTTPS connection, etc.).

Moving to operation 460, the recovery key may be decrypted using the user device private cryptographic key of the cryptographic key pair that was generated at operation 452. However, as was discussed above with respect to FIGS. 4A-4B, it may not be possible to decrypt the encrypted recovery key without first retrieving the server recovery key. Accordingly, flow progresses to operation 462, where the server recovery key may be requested from server 404. According to aspects disclosed herein, the request may comprise a unique identifier (e.g., as may be associated with user device 402 and/or a user of user device 402, etc.).

As a result of requesting the server recovery key, it may be possible to trace or otherwise log information associated with reset scenarios, including, but not limited to, an identity of a user, an identity of a user device, and/or an identity of a trusted third party without the server ever actually having access to the master password or the local ciphering key.

According to aspects disclosed herein, recovery data may reside on user device 402, such that server 404 and a third party 406 may not be able to access the decrypted representation of the user data. In an example, while at least a part of the encrypted user data may be stored by server 404, information needed to decrypt the encrypted user data (e.g., a local ciphering key and a decrypted recovery key) may be stored at one or more other computing devices, such as user device 402 and third party 406. However, while server device 404 may be unable to gain access to the decrypted user data, encrypting the recovery key with the server recovery key as described above may thereby cause user device 402 to communicate with server 404 in a reset scenario. As a result, it may be possible to identify potential abuses of the reset processes disclosed herein, as well as provide accountability when such processes are used.

With respect to FIG. 4D, flow progresses to operation 464, where identity verification may be performed by the server. Identity verification may comprise issuing an authentication challenge to user device 402 (e.g., requesting a password, biometric identification, providing a token to a user of user device 402 and prompting for receipt of that token, etc.). As an example, the token may be provided in an email or text message sent to a device of the user. In some examples, an identifier (e.g., associated with user device 402 and/or a user of user device 402, etc.) may have been provided with the server recovery key request at operation 462, such that the received identifier may be compared against an identifier that was previously associated with a requested server recovery key. In some examples, the identifier may be used by server 404 to identify a stored server recovery key that is associated with the user and/or user device 402. In other examples, identity verification may be performed manually by a person, wherein server 404 may request or indicate that the person interact with a user of user device 402. As an example, the person may communicate with the user (e.g., via an email or instant messaging platform, social media, or a telephone or video call, etc.) to confirm the user's identity (e.g., by asking personal questions, based on a familiarity with the user, etc.). Once the user's identity has been confirmed by the person, the person may provide an indication to server 404, which may continue execution as discussed below. It will be appreciated that alternative or additional identity verification techniques may be used or, in some examples, may be omitted.

If identity verification succeeds, flow progresses to operation 466 where server 404 may provide the server recovery key to user device 402. As illustrated, the server recovery key is provided to user device 402 in plaintext. It will be appreciated that other communication mechanisms may be used to secure the communication of the server recovery key between server 404 and user device 402. Accordingly, the server recovery key may be used at operation 468 to decrypt the encrypted recovery key. As a result of decrypting the encrypted recovery key, the decrypted recovery key may be used at operation 470 to decrypt the local ciphering key, which may have been encrypted and stored at operation 414 as discussed above with respect to FIG. 4A. Moving to operation 472, the decrypted local ciphering key may be used to decrypt user data. As a result, user data may ultimately be decrypted without use of the master password, thereby facilitating user access to the user data in a reset scenario. After gaining access to the user data using the local ciphering key, the local ciphering key may be encrypted using a new master password, such that the user may once again access data during normal operation encrypted using the local ciphering key by entering a master password with or without ever re-ciphering the user data. Flow terminates at operation 472.

Figure 5:
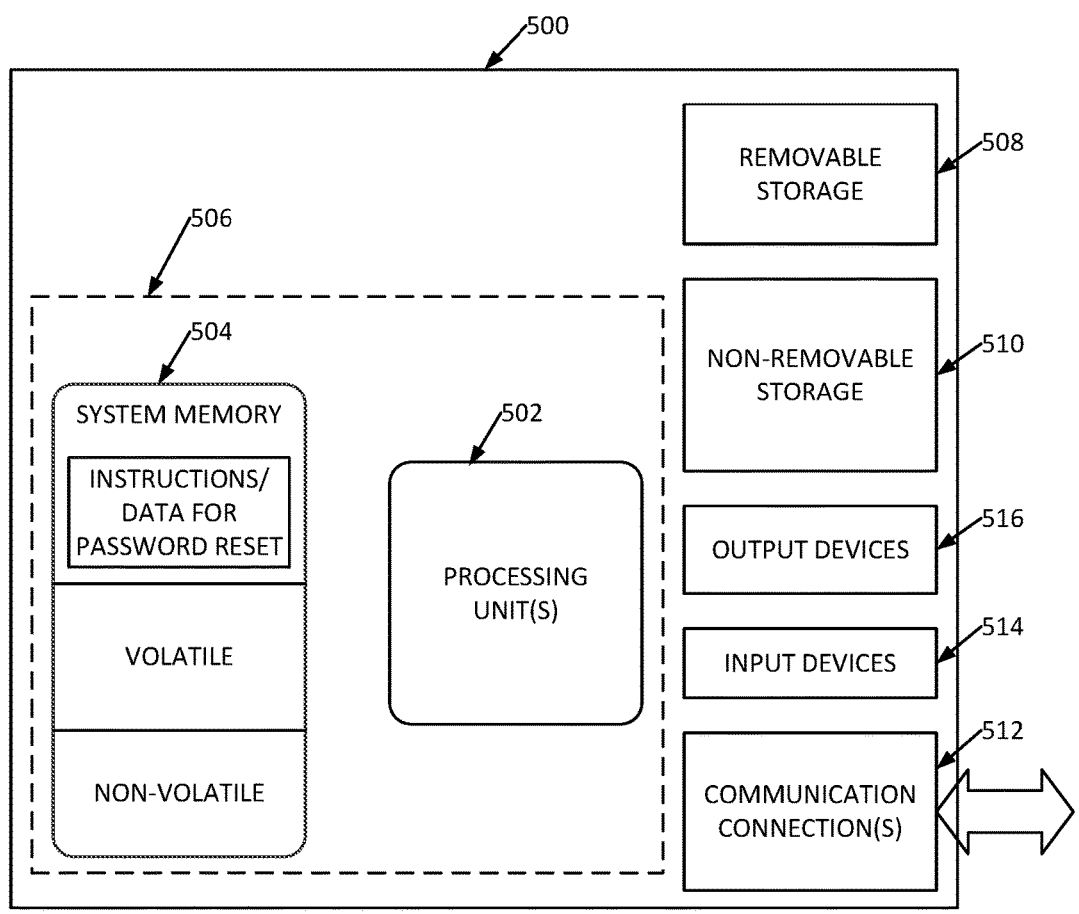
FIG. 5 illustrates an example of a suitable operating environment in which one or more of the present embodiments may be implemented.

FIG. 5 illustrates an example of a suitable operating environment 500 in which one or more of the present embodiments may be implemented. For example, computing devices such as user computing device 102, server 104, third-party computing device 106, etc., may comprise the system 500. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically may include at least one processing unit 502 and memory 504. Depending on the exact configuration and type of computing device, memory 504 (storing, among other things, zero-knowledge application module(s), e.g., one or more cryptographic keys, encrypted user data, encrypted backup data, one or more encrypted local ciphering keys, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 may include at least some form of computer readable media. The computer readable media may be any available media that can be accessed by processing unit 502 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504, such as application 110 in FIG. 1. While executing on the processing unit 502, program modules 508 (e.g., applications, Input/Output (I/O) management, and other utilities) may perform processes including, but not limited to, one or more of the stages of the operational methods described herein such as the methods illustrated in FIGS. 2A-B, 3A-B, and 4A-D, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system comprising: at least one processor; and memory storing instructions that, when executed by the at least one processor, causes the system to perform a set of operations. The set of operations comprises: obtaining a local ciphering key for encrypting user data; encrypting, using a recovery key, the local ciphering key to generate an encrypted local ciphering key; storing the encrypted local ciphering key on a user device; encrypting, using a server recovery key, the recovery key to generate an encrypted recovery key; transmitting the encrypted recovery key to a third party; receiving, at the user device, a reset indication; decrypting the encrypted local ciphering key using the recovery key; and decrypting encrypted user data using the decrypted local ciphering key. In an example, the set of operations further comprises: encrypting, using a master password, the local ciphering key to generate a second encrypted local ciphering key; storing the second encrypted local ciphering key on the user device; decrypting the second encrypted local ciphering key using a received master password input to generate a decrypted local ciphering key; and encrypting, using the decrypted local ciphering key, user data of an application. In another example, the set of operations further comprises: receiving a master password input at the user device; decrypting the second encrypted local ciphering key based on the master password input at the user device to generate a decrypted local ciphering key; and using the decrypted local ciphering key to access encrypted user data. In a further example, transmitting the encrypted recovery key to the third party comprises: encrypting, using a public key of a cryptographic key pair, the encrypted recovery key to generate a protected encrypted recovery key; and providing the protected encrypted recovery key to a server device for transmission to the third party. In yet another example, the public key of the cryptographic key pair is received by the user device from the third party. In a further still example, the server recovery key is transmitted to a server device in plaintext and is not retained by the user device. In another example, decrypting the encrypted local ciphering key comprises: receiving, from a server device, the server recovery key; receiving, from the third party, the encrypted recovery key; decrypting, based on the server recovery key, the encrypted recovery key to determine the recovery key; accessing the stored encrypted local ciphering key; and decrypting the local ciphering key from the stored encrypted local ciphering key using the recovery key.

In another aspect, the technology relates to a method for master password reset. The method comprises: receiving, at a user device, a reset indication; requesting, from a server device, a server recovery key associated with the user device; receiving the server recovery key from the server device; requesting, from a third party, an encrypted recovery key associated with the user device, wherein the third party is different from the server device; receiving the encrypted recovery key from the third party; decrypting, using the server recovery key, the encrypted recovery key to determine the recovery key; accessing an encrypted local ciphering key, wherein the encrypted local ciphering key is associated with encrypted user data; decrypting, based on the recovery key, a local ciphering key from the encrypted local ciphering key; and accessing, using the local ciphering key, decrypted user data from the encrypted user data. In an example, the method further comprises: receiving a new master password; encrypting, using the new master password, the local ciphering key to generate a second encrypted local ciphering key; and storing the second encrypted local ciphering key on the user device. In another example, the method further comprises at least one of: receiving an authentication challenge from the server device prior to receiving the server recovery key from the server device; and receiving an authentication challenge from the third party prior to receiving the encrypted recovery key from the third party. In a further example, the method further comprises: generating an asymmetric cryptographic key pair; and providing a public key of the asymmetric cryptographic key pair to the third party. In yet another example, the received encrypted recovery key is encrypted using the public key of the asymmetric cryptographic key pair. In a further still example, the server recovery key is received from the server device in plaintext.

In a further aspect, the technology relates to a method for preserving access to user data. The method comprises: generating a local ciphering key for encrypting user data; encrypting, using a recovery key, the local ciphering key to generate an encrypted local ciphering key; storing the encrypted local ciphering key on a user device; encrypting, using a server recovery key, the recovery key to generate an encrypted recovery key; transmitting the encrypted recovery key to a third party; receiving, at the user device, a reset indication; decrypting the encrypted local ciphering key using the recovery key; and decrypting encrypted user data using the decrypted local ciphering key. In an example, the method further comprises: encrypting, using a master password, the local ciphering key to generate a second encrypted local ciphering key; storing the second encrypted local ciphering key on the user device; decrypting the second encrypted local ciphering key using a received master password input to generate a decrypted local ciphering key; and encrypting, using the decrypted local ciphering key, user data of an application. In another example, the method further comprises: receiving a master password input at the user device; decrypting the second encrypted local ciphering key based on the master password input at the user device to generate a decrypted local ciphering key; and using the decrypted local ciphering key to access encrypted user data. In a further example, transmitting the encrypted recovery key to the third party comprises: encrypting, using a public key of a cryptographic key pair, the encrypted recovery key to generate a protected encrypted recovery key; and providing the protected encrypted recovery key to a server device for transmission to the third party. In yet another example, the cryptographic key pair is received by the user device from the third party. In a further still example, the server recovery key is transmitted to a server device in plaintext and is not retained by the user device. In another example, decrypting the encrypted local ciphering key comprises: receiving, from a server device, the server recovery key; receiving, from the third party, the encrypted recovery key; decrypting, based on the server recovery key, the encrypted recovery key to determine the recovery key; accessing a stored encrypted local ciphering key; and generating, using the recovery key, a decrypted local ciphering key based on the stored encrypted local ciphering key.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:
1. A system comprising:
   at least one processor; and
   memory storing instructions that, when executed by the at least one processor, causes the system to perform a set of operations, the set of operations comprising:
      obtaining a local ciphering key for encrypting user data;
      encrypting, using a recovery key, the local ciphering key to generate an encrypted local ciphering key;
      storing the encrypted local ciphering key on a user device;
      encrypting, using a server recovery key, the recovery key to generate an encrypted recovery key;
      transmitting the server recovery key to a server device;

transmitting the encrypted recovery key to a third party, wherein the server recovery key is not stored by the third party;
receiving, at the user device, a reset indication;
decrypting the encrypted local ciphering key using the recovery key; and
decrypting encrypted user data using the decrypted local ciphering key.

2. The system of claim 1, wherein the set of operations further comprises:
encrypting, using a master password, the local ciphering key to generate a second encrypted local ciphering key;
storing the second encrypted local ciphering key on the user device;
decrypting the second encrypted local ciphering key using a received master password input to generate a decrypted local ciphering key; and
encrypting, using the decrypted local ciphering key, user data of an application.

3. The system of claim 1, wherein the set of operations further comprises:
receiving a master password input at the user device;
decrypting the second encrypted local ciphering key based on the master password input at the user device to generate a decrypted local ciphering key; and
using the decrypted local ciphering key to access encrypted user data.

4. The system of claim 1, wherein transmitting the encrypted recovery key to the third party comprises:
encrypting, using a public key of a cryptographic key pair, the encrypted recovery key to generate a protected encrypted recovery key; and
providing the protected encrypted recovery key to the server device for transmission to the third party.

5. The system of claim 4, wherein the public key of the cryptographic key pair is received by the user device from the third party.

6. The system of claim 1, wherein the server recovery key is transmitted to the server device in plaintext and is not retained by the user device.

7. The system of claim 1, wherein decrypting the encrypted local ciphering key comprises:
receiving, from the server device, the server recovery key;
receiving, from the third party, the encrypted recovery key;
decrypting, based on the server recovery key, the encrypted recovery key to determine the recovery key;
accessing the stored encrypted local ciphering key; and
decrypting the local ciphering key from the stored encrypted local ciphering key using the recovery key.

8. A method for master password reset, comprising:
receiving, at a user device, a reset indication;
requesting, from a server device, a server recovery key associated with the user device;
receiving the server recovery key from the server device;
requesting, from a third party, an encrypted recovery key associated with the user device, wherein the third party is different from the server device;
receiving the encrypted recovery key from the third party;
decrypting, using the server recovery key, the encrypted recovery key to determine the recovery key;
accessing an encrypted local ciphering key, wherein the encrypted local ciphering key is associated with encrypted user data;
decrypting, based on the recovery key, a local ciphering key from the encrypted local ciphering key; and
accessing, using the local ciphering key, decrypted user data from the encrypted user data.

9. The method of claim 8, further comprising:
receiving a new master password;
encrypting, using the new master password, the local ciphering key to generate a second encrypted local ciphering key; and
storing the second encrypted local ciphering key on the user device.

10. The method of claim 8, further comprising at least one of:
receiving an authentication challenge from the server device prior to receiving the server recovery key from the server device; and
receiving an authentication challenge from the third party prior to receiving the encrypted recovery key from the third party.

11. The method of claim 8, further comprising:
generating an asymmetric cryptographic key pair; and
providing a public key of the asymmetric cryptographic key pair to the third party.

12. The method of claim 11, wherein the received encrypted recovery key is encrypted using the public key of the asymmetric cryptographic key pair.

13. The method of claim 8, wherein the server recovery key is received from the server device in plaintext.

14. A method for preserving access to user data, comprising:
generating a local ciphering key for encrypting user data;
encrypting, using a recovery key, the local ciphering key to generate an encrypted local ciphering key;
storing the encrypted local ciphering key on a user device;
encrypting, using a server recovery key of a server device, the recovery key to generate an encrypted recovery key;
transmitting the encrypted recovery key to a third party device, wherein the server recovery key is not stored by the third party device and wherein the third party device is different from the server device;
receiving, at the user device, a reset indication;
decrypting the encrypted local ciphering key using the recovery key; and
decrypting encrypted user data using the decrypted local ciphering key.

15. The method of claim 14, further comprising:
encrypting, using a master password, the local ciphering key to generate a second encrypted local ciphering key;
storing the second encrypted local ciphering key on the user device;
decrypting the second encrypted local ciphering key using a received master password input to generate a decrypted local ciphering key; and
encrypting, using the decrypted local ciphering key, user data of an application.

16. The method of claim 14, further comprising:
receiving a master password input at the user device;
decrypting the second encrypted local ciphering key based on the master password input at the user device to generate a decrypted local ciphering key; and
using the decrypted local ciphering key to access encrypted user data.

17. The method of claim 14, wherein transmitting the encrypted recovery key to the third party device comprises:
encrypting, using a public key of a cryptographic key pair, the encrypted recovery key to generate a protected encrypted recovery key; and providing the protected encrypted recovery key to the server device for transmission to the third party device.

18. The method of claim 17, wherein the cryptographic key pair is received by the user device from the third party device.

19. The method of claim 14, wherein the server recovery key is transmitted to the server device in plaintext and is not retained by the user device.

20. The method of claim 14, wherein decrypting the encrypted local ciphering key comprises:
  receiving, from the server device, the server recovery key;
  receiving, from the third party device, the encrypted recovery key;
  decrypting, based on the server recovery key, the encrypted recovery key to determine the recovery key;
  accessing a stored encrypted local ciphering key; and
  generating, using the recovery key, a decrypted local ciphering key based on the stored encrypted local ciphering key.

* * * * *